United States Patent
Sauli

[11] 3,755,350
[45] Aug. 28, 1973

[54] SUBSTITUTED 3-PHENYL HYDANTOINS USEFUL AS FUNGICIDES

[75] Inventor: Michel Sauli, Paris, France

[73] Assignee: Rhone-Poulenc S.A., Paris, France

[22] Filed: Oct. 5, 1971

[21] Appl. No.: 186,772

[30] Foreign Application Priority Data
Oct. 6, 1970  France .............................. 7036084
Aug. 6, 1971  France .............................. 7128896

[52] U.S. Cl............ 260/309.5, 260/453 A, 260/454, 260/470, 260/471 C, 260/516, 260/518 R, 424/273
[51] Int. Cl............................................. C07d 49/32
[58] Field of Search ................................. 260/309.5

[56] References Cited
FOREIGN PATENTS OR APPLICATIONS
1,018,261  10/1957  Germany ........................ 260/309.5
1,212,974  3/1966   Germany ........................ 260/309.5

OTHER PUBLICATIONS
Biltz et al., Chem. Abst., Vol. 21, pages 3351-3352 (1927). QD1.A51
Bornwater, Chem. Abst., Vol. 6, pages 2743-2744 (1912). QD1.A51
Farbwerke Hoechst, Chem. Abst., Vol. 72, No. 89756h (1970). QD1.A51
Freter et al., Chem. Abst., Vol. 52, Columns 8125-8126 (1958). QD1.A51
Johnson et al., Chem. Abst., Vol. 7, pages 3508-3509 (1913). QD1.A51
Reeve et al., Chem. Abst., Vol. 71, No. 13057q (1969). QD1.A51
Stark, Chem. Abst., Vol. 63, Column 18516 (1965). QD1.A51
Swan, Chem. Abst., Vol. 47, column 9274 (1953). QD1.A51
Umemoto, Chem. Abst., Vol. 61, Column 8296 (1964). QD1.A51
Murray, Chem. Abst., Vol. 71, No. 14440w (1969). QD1.A51

Primary Examiner—Natalie Trousof
Attorney—Stevens, Davis, Miller and Mosher

[57]  ABSTRACT

The hydantoin derivatives of the formula:

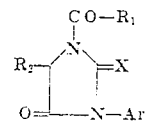

wherein Ar represents phenyl, or phenyl carrying substituents selected from halogen, alkyl, alkoxy and trifluoromethyl, $R_1$ represents alkoxy or a grouping $-NR_3R_4$, in which $R_3$ and $R_4$ represent hydrogen, alkyl or alkenyl, $R_2$ represents hydrogen or alkyl, and X represents oxygen or sulphur, possess fungicidal properties.

9 Claims, No Drawings

SUBSTITUTED 3-PHENYL HYDANTOINS USEFUL AS FUNGICIDES

This invention relates to new hydantoin derivatives which possess fungicidal properties, to processes for their preparation and to compositions containing them.

The hydantoin derivatives of the present invention are compounds of the general formula:

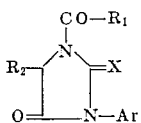   I wherein Ar represents a phenyl radical or a phenyl radical carrying one to five substituents, which may be the same or different, selected from halogen atoms (preferably chlorine), alkyl and alkoxy radicals containing one to four carbon atoms and the trifluoromethyl radical, $R_1$ represents an alkoxy radical containing one to four carbon atoms or a grouping $-NR_3R_4$, in which $R_3$ and $R_4$ are the same or different and each represents a hydrogen atom, an alkyl radical containing one to four carbon atoms or an alkenyl radical containing two to four carbon atoms, $R_2$ represents a hydrogen atom or an alkyl radical containing one to four carbon atoms, and X represents an oxygen or sulphur atom.

According to a feature of the invention, the hydantoin derivatives of general formula I are prepared by the process which comprises reacting a compound of the general formula:

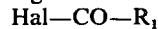   II (wherein Hal represents a halogen, preferably chlorine, atom and $R_1$ is as hereinbefore defined) with a hydantoin compound of the general formula:

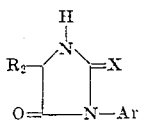   III wherein Ar, $R_2$ and X are as hereinbefore defined. Generally the reaction can be carried out in a basic organic solvent such as pyridine or in an organic solvent such as benzene, chloroform, acetonitrile, dimethylformamide or N-methylpyrrolidone, in the presence of a strong base such as an alkali metal alkoxide, for example potassium ethoxide, at a temperature between 0°C. and the boiling temperature of the reaction mixture.

The starting materials of general formula III can be obtained by cyclisation of an acid or ester of the general formula:

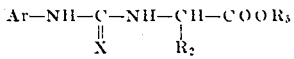   IV wherein $R_5$ represents a hydrogen atom or an alkyl radical containing one to four carbon atoms, and Ar, $R_2$ and X are as hereinbefore defined. The cyclisation can generally be effected by heating in an organic solvent in the presence of a basic condensation agent.

The compounds of general formula IV can be obtained either: (a) by the action of an acid or ester of the general formula:

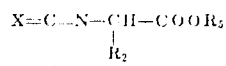   V (wherein $R_2$, X and $R_5$ are as hereinbefore defined) on an aniline of the general formula:

   VI

Ar—NH$_2$ (wherein Ar is as hereinbefore defined), or (b) by the action of an amino-acid or ester of the general formula:

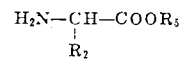   VII (wherein $R_2$ and $R_5$ are as hereinbefore defined) on a phenyl isocyanate or isothiocyanate of the general formula:

Ar—N=C=X   VIII (wherein Ar and X are as hereinbefore defined) according to known methods for the preparation of ureas and thioureas.

According to another feature of the invention the hydantoin derivatives of general formula I, wherein $R_1$ represents a grouping $-NR_3R_4$ in which $R_3$ represents a hydrogen atom and $R_4$ represents an alkyl radical containing one to four carbon atoms or an alkenyl radical containing two to four carbon atoms, are prepared by the process which comprises reacting an isocyanate of the general formula:

   IX (wherein $R_{4'}$ represents an alkyl radical containing one to four carbon atoms or an alkenyl radical containing two to four carbon atoms) with a hydantoin compound of general formula III by known methods for the preparation of ureas, for example by heating the reactants in an organic solvent such as benzene or acetone in the presence of a basic condensation agent such as triethylamine. By the term "known methods" is meant methods heretofore used or described in the literature.

The hydantoin derivatives of general formula I obtained by the aforementioned processes may optionally be purified by physical methods such as crystallisation, distillation or chromatography.

The hydantoin derivatives of general formula I possess valuable fungicidal properties; they are particularly active against grey moulds (*Botrytis cinerea*), bean anthracnose (*Collectotrichum lindemuthianum*) and sclerotinia rot (*Sclerotinia sclerotiorum*) when used in quantities between 25 and 100 g. per hectolitre of, for example, water They are particularly interesting for the treatment of vines, strawberry plants, fruit trees (e.g. peach, apricot and cherry trees) and market gardening produce (e.g. vegetables for salads) to control fungal infections. Preferred compounds are those in which Ar represents the phenyl radical or a phenyl radical carrying one or two substituents selected from chlorine and fluorine atoms, alkyl radicals containing one to four carbon atoms (preferably methyl) and the trifluoromethyl radical, and more particularly those compounds wherein Ar represents the 3,5-dichlorophenyl radical, $R_1$ represents a grouping $-NR_3R_4$ in which $R_3$ represents a hydrogen atom and $R_4$ represents an alkyl radical containing one to four carbon atoms or an alkenyl radical containing two to four carbon atoms (preferably allyl), and $R_2$ and X are as hereinbefore defined. Of outstanding importance are 1-propylcarbamoyl-3-(3,5-dichlorophenyl)hydantoin, 1-allylcarbamoyl-3-

(3,5-dichlorophenyl)hydantoin, 1-isopropylcarbamoyl-3-(3,5-dichlorophenyl)hydantoin, 1-methylcarbamoyl-3-(3,5-dichlorophenyl)hydantoin, 1-ethylcarbamoyl-3-(3,5-dichlorophenyl)hydantoin, 1-methylcarbamoyl-3-(3,5-dichlorophenyl)-2-thiohydantoin and 1-ethylcarbamoyl-3-(3,5-dichlorophenyl)-2-thiohydantoin.

The present invention also includes within its scope fungicidal compositions which comprise, as the active ingredient, at least one hydantoin derivative of general formula I in association with one or more diluents or adjuvants compatible with the hydantoin derivative(s) and suitable for use in agricultural fungicidal compositions. These compositions can optionally contain other compatible pesticides, such as insecticides or fungicides (e.g. maneb). Preferably the compositions contain between 0.005 percent and 80 percent by weight of hydantoin derivative.

The compositions may be solid if there is employed a powdered solid compatible diluent such as talc, calcined magnesia, kieselguhr, tricalcium phosphate, powdered cork, adsorbent charcoal, or a clay such as kaolin or bentonite. These solid compositions are preferably prepared by grinding the hydantoin derivative with the solid diluent, or by impregnating the solid diluent with a solution of the hydantoin derivative in a volatile solvent, evaporating the solvent, and if necessary grinding the product so as to obtain a powder.

Instead of a solid diluent, there may be used a liquid in which the hydantoin derivative is dissolved or dispersed. The compositions may thus take the form of suspensions, emulsions or solutions in organic or aqueous-organic media, for example aromatic hydrocarbons such as toluene or xylene, mineral, animal or vegetable oils, anisole, cyclohexanone or acetophenone, or mixtures of these diluents. The compositions in the form of suspensions, emulsions or solutions may contain wetting, dispersing or emulsifying agents of the ionic or nonionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxy groups by condensation with ethylene oxide. It is preferable to use agents of the non-ionic type because they are not sensitive to electrolytes. When emulsions are required, the hydantoin derivatives may be used in the form of self-emulsifying concentrates containing the active substance dissolved in the emulsifying agent(s) or in a solvent containing the emulsifying agent(s) compatible with the hydantoin derivative and solvent, a simple addition of water to such concentrates producing compositions ready for use.

The hydantoin derivatives of general formula I are preferably employed as fungicides in quantities of 20 to 200 g. per hectolitre of water, and in the field at the rate of about 1,000 litres of solution per hectare under cultivation.

The following Examples illustrate the invention.

EXAMPLE 1

A 22.5 percent (w/v) ethanolic solution of potassium ethoxide (32 cc.) is added to a suspension of 3-phenylhydantoin (12.3 g.) in benzene (150 cc.). After azeotropic distillation of the ethanol, methyl chloroformate (6.6 g.) is added and the reaction mixture heated for 10 minutes under reflux. The benzene is then evaporated under reduced pressure and the residue is recrystallised from ethanol to yield 1-methoxycarbonyl-3-phenylhydantoin (11 g.) melting at 154°C.

3-Phenylhydantoin, m.p. 156°C., employed as starting material can be prepared according to the method described by Dains, J. Amer. Chem. Soc., 44, 2312 (1922).

By proceeding as described above but starting with appropriate compounds of general formulae II and III there are obtained the following products:

| Example No. | Product | Melting Point (°C.) |
|---|---|---|
| 2. | 1-Methoxycarbonyl-3-(3-chlorophenyl)-hydantoin | 140 |
| 3. | 1-Ethoxycarbonyl-3-(3-chlorophenyl)-hydantoin | 128 |
| 4. | 1-Methoxycarbonyl-3-(3,5-dichlorophenyl)hydantoin | 200 |
| 5. | 1-Ethoxycarbonyl-3-(3,5-dichlorophenyl)hydantoin | 156 |
| 6. | 1-Ethoxycarbonyl-3-(3-fluorophenyl)-hydantoin | 126 |
| 7. | 1-Ethoxycarbonyl-3-(2,4-dichlorophenyl)-5methylhydantoin | 100 |
| 8. | 1-Methoxycarbonyl-3-(2,4-dichlorophenyl)-5-methylhydantoin | 105 |
| 9. | 1-Methoxycarbonyl-3-(2,4-dichlorophenyl)hydantoin | 162 |
| 10. | 1-Methoxycarbonyl-3-(3,5-dimethylphenyl)-hydantoin | 136 |

EXAMPLE 11

A 22.5 percent (w/v) ethanolic solution of potassium ethoxide (26 cc.) is added to a suspension of 3-(3-chlorophenyl)hydantoin (14 g.) in benzene (200 cc.). After azeotropic distillation of the ethanol, dimethylcarbamoyl chloride (7.2 g.) is added and the reaction mixture is heated for 10 minutes under reflux. The precipitate which forms is filtered off and the benzene is evaporated under reduced pressure. The residue obtained is washed successively with anaesthetic grade diethyl ether (50 cc.) and petroleum ether (b.p. 50°-70°C.; 50 cc.) to yield 1-dimethylcarbamoyl-3-(3-chlorophenyl)hydantoin (7.8 g.) melting at 152°C.

3-(3-Chlorophenyl)hydantoin, m.p. 143°C., employed as starting material can be prepared according to the method described by Dains, J. Amer. Chem. Soc., 44, 2312 (1922).

EXAMPLE 12

Allyl isocyanate (4.5 g.) and triethylamine (5.5 g.) are added to a solution of 3-(3,5-dichlorophenyl)hydantoin (11 g.) in acetone (150 cc.). After 30 minutes heating under reflux followed by cooling, the acetone is evaporated under reduced pressure. The residue obtained is washed with petroleum ether (b.p. 50°-70°C.; 250 cc.) and recrystallised from ethanol to yield 1-allylcarbamoyl-3-(3,5-dichlorophenyl)hydantoin (11 g.) melting at 116°C.

3-(3,5-Dichlorophenyl)hydantoin, m.p. 199°C., employed as starting material can be prepared according to the method described by Dhar, J. Soc. Ind. Research, 20c, 145 (1961).

EXAMPLE 13

Propyl isocyanate (4.6 g.) and triethylamine (5.5 g.) are added to a solution of 3-(3,5-dichlorophenyl)- hydantoin (11 g.) in acetone (150 cc.). After 30 minutes heating under reflux followed by cooling, the acetone is evaporated under reduced pressure. The residue obtained is washed with petroleum ether (b.p. 50°-70°C.; 250 cc.) and recrystallised from diisopropyl ether to yield 1-propylcarbamoyl-3-(3,5-dichlorophenyl)hydantoin (11 g.) melting at 92°C.

By proceeding as described above but starting with appropriate compounds of general formulae III and IX there are obtained the following products:

| Example No. | Product | Melting Point (°C.) |
|---|---|---|
| 14. | 1-Isopropylcarbamoyl-3-(3-chlorohenyl)hydantoin | 109 |
| 15. | 1-Propylcarbamoyl-3-(3-chlorophenyl)-hydantoin | 90 |
| 16. | 1-Methylcarbamoyl-3-(3,5-dichlorophenyl)hydantoin | 163 |
| 17. | 1-Ethylcarbamoyl-3-(3,5-dichlorophenyl)hydantoin | 152 |
| 18. | 1-Methylcarbamoyl-3-(3-chlorophenyl)-5-methylhydantoin | 130 |
| 19. | 1-Isopropylcarbamoyl-3-(3,5-dichlorophenyl)hydantoin | 136 |
| 20. | 1-Butylcarbamoyl-3-(3,5-dichlorophenyl)hydantoin | 112 |
| 21. | 1-Isopropylcarbamoyl-3-(3,5-dichlorophenyl)-5-methylhydantoin | 125 |
| 22. | 1-Ethylcarbamoyl-3-(3-fluorophenyl)-hydantoin | 140 |
| 23. | 1-Propylcarbamoyl-3-(3-fluorophenyl)-hydantoin | 93 |
| 24. | 1-Methylcarbamoyl-3-(3-trifluoromethylphenyl)hydantoin | 120 |
| 25. | 1-Methylcarbamoyl-3-(3-fluorophenyl)-hydantoin | 207 |

EXAMPLE 26

Methyl isocyanate (3.4 g.) and triethylamine (4 g.) are added to a suspension of 3-(3,5-dichlorophenyl)-5-methylhydantoin (10.4 g.) in benzene (150 cc.). After heating for 1 hour under reflux followed by cooling, the benzene is evaporated under reduced pressure. The residue obtained is washed with anaesthetic grade diethyl ether (30 cc.) and petroleum ether (b.p. 50°-70°C.; 200 cc.) and recrystallised from ethanol to yield 1-methylcarbamoyl-3-(3,5-dichlorophenyl)-5-methylhydantoin (9g.) melting at 137°C.

3-(3,5-Dichlorophenyl)-5-methylhydantoin, m.p. 15-6°C., employed as starting material can be prepared according to the method described by Dhar, J. Soc. Ind. Research, 20c, 145 (1961).

By proceeding as described above but starting with with appropriate compounds of general formulae III and IX there are obtained the following products:

| Example No. | Product | Melting Point (°C.) |
|---|---|---|
| 27. | 1-Butylcarbamoyl-3-(3,5-dichlorophenyl)-5-methylhydantoin | 95 |
| 28. | 1-t-Butylcarbamoyl-3-(3,5-dichlorophenyl)hydantoin | 181 |

EXAMPLE 29

Methyl isocyanate (3.4 g.) and triethylamine (5 g.) are added to a solution of 3-(3,5-dimethylphenyl)-hydantoin (10.2 g.) in acetone (120 cc.). After leaving the reaction mixture to stand for 24 hours at a temperature of about 20°C., the precipitate which forms is filtered off and dried in vacuo over sulphuric acid. There is thus obtained 1-methylcarbamoyl-3-(3,5-dimethylphenyl)hydantoin (11 g.) melting at 204°C.

3-(3,5-Dimethylphenyl)hydantoin, m.p. 128°C., employed as starting material can be prepared according to the method described by Dhar, J. Soc. Ind. Research, 20c, 145 (1961).

EXAMPLE 30

A 22.5 percent (w/v) ethanolic solution of potassuim ethoxide (13 cc.) is added to a solution of 3-phenyl-2-thiohydantoin (6.8 g.) in N-methylpyrrolid-2-one (150 cc.). After distillation of the ethanol under reduced pressure, ethyl chloroformate (3.8 g.) is added and the reaction mixture stirred for 5 hours at about 25°C. A small amount of insoluble material is separated by filtration and the filtrate poured into ice-water (500 cc.). The precipitate which forms is filtered off and recrystallised from ethanol to yield 1-ethoxycarbonyl-3-phenyl-2-thiohydantoin (4.2 g.) melting at 142°C.

3-Phenyl-2-thiohydantoin, m.p. 242°C., employed as starting material can be prepared according to the method described by Aschan, Ber., 17, 424 (1884).

By proceeding as described above but starting with appropriate compounds of general formulae II and III there are obtained the following products:

| Example No. | Product | Melting Point (°C.) |
|---|---|---|
| 31. | 1-Methoxycarbonyl-3-phenyl-2-thiohydantoin | 180 |
| 32. | 1-Methoxycarbonyl-3-(3,5-dichlorophenyl)-2-thiohydantoin | 174 |

EXAMPLE 33

Methyl isocyanate (3.2 g.) and triethylamine (0.5 cc.) are added to a suspension of 3-(3-chlorophenyl)-2-thiohydantoin (7 g.) in benzene (100 cc.). After heating for 2 hours under reflux followed by cooling, the precipitate which forms is filtered off, washed with diisopropyl ether (2 × 50 cc.) and dried in vacuo over sulphuric acid. There is thus obtained 1-methylcarbamoyl-3-(3-chlorophenyl)-2-thiohydantoin (6.7 g.) melting at 170°C.

3-(3-Chlorophenyl)-2-thiohydantoin, m.p. 216°C., employed as starting material can be prepared according to the method described by Dains, J. Amer. Cham. Soc.,44, 2312 (1922).

By proceeding as described above but starting with appropriate compounds of general formulae III and IX there are obtained the following products:

| Example No. | Product | Melting Point (°C.) |
|---|---|---|
| 34. | 1-Methylcarbamoyl-3-(3,5-dichlorophenyl)-2-thiohydantoin | 210 |
| 35. | 1-Ethylcarbamoyl-3-(3,5-dichlorophenyl)-2-thiohydantoin | 216 |

EXAMPLE 36

A 22.5 percent (w/v) ethanolic solution of potassium ethoxide (15.4 cc.) is added to a solution of 3-(3,5-dichlorophenyl)-2-thiohydantoin (10.4 g.) in dimethylformamide (150 cc.). After removal of the ethanol by distillation, dimethylcarbamoyl chloride (4.3 g.) is added. After leaving the reaction mixture overnight at a temperature of about 20°C., the reaction mixture is poured into water (1,500 cc.) and the precipitate which forms is extracted with methylene chloride (1,000 cc.). After chromatography through a column of "Florisil" (an activated magnesium silicate) and recrystallisation from toluene, there is obtained 1-dimethylcarbamoyl-3-(3,5-dichlorophenyl)-2-thiohydantoin (1.6 g.) melting at 216°C.

3-(3,5-Dichlorophenyl)-2-thiohydantoin, m.p. 285-°C., employed as starting material can be prepared according to the method described by Dains, J. Amer. Chem. Soc., 44, 2312 (1922).

EXAMPLE 37

In accordance with a usual technique there is prepared an emulsifiable solution having the following composition:

| | |
|---|---|
| 1-propylcarbamoyl-3-(3,5-dichlorophenyl) hydantoin | 400 g. |
| Tween 20 | 10 g. |
| Atlox 4855 | 90 g. |
| cyclohexanone-xylene mixture (1-3 by volume) quantity to make up to | 1,000 cc. |

EXAMPLE 38

In accordance with a usual technique there is prepared an emulsifiable solution having the following composition:

| | | |
|---|---|---|
| 1-propylcarbamoyl-3-(3,5-dichlorophenyl) hydantoin | | 400 g. |
| Tween 20 | | 10 g. |
| Atlox 4855 | | 90 g. |
| anisole, | quantity to make up to | 1,000 cc. |

"Tween 20" is a wetting agent which is a condensate of ethylene oxide with fatty acid esters of sorbitol, and "Atlox 4855" is an emulsifying agent which is a polyoxyethylene derivative of an arylsulphonate.

I claim:

1. A hydantoin derivative of the formula:

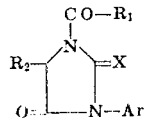

wherein Ar represents phenyl or phenyl substituted with one to two substituents selected from the group consisting of chlorine, fluorine, alkyl of one to four carbon atoms and trifluoromethyl; $R_1$ represents alkoxy of one to four carbon atoms or $-NR_3R_4$, in which $R_3$ and $R_4$ represents hydrogen, alkyl of one to four carbon atoms or alkenyl of two to four carbon atoms; $R_2$ represents hydrogen or alkyl of one to four carbon atoms; and X represents oxygen or sulphur.

2. A hydantoin derivative according to claim 1 wherein Ar represents 3,5-dichlorophenyl; $R_1$ represents $-NHR_4$ in which $R_4$ represents alkyl of one to four carbon atoms or alkenyl of two to four carbon atoms; and $R_2$ and X are as defined in claim 1.

3. The hydantoin derivative according to claim 1 which is 1-propylcarbamoyl-3-(3,5-dichlorophenyl)hydantoin.

4. The hydantoin derivative according to claim 1 which is 1-allylcarbamoyl-3-(3,5-dichlorophenyl)hydantoin.

5. The hydantoin derivative according to claim 1 which is 1-isopropylcarbamoyl-3-(3,5-dichlorophenyl)hydantoin.

6. The hydantoin derivative according to claim 1 which is 1-methylcarbamoyl-3-(3,5-dichlorophenyl)hydantoin.

7. The hydantoin derivative according to claim 1 which is 1-ethylcarbamoyl-3-(3,5-dichlorophenyl)hydantoin.

8. The hydantoin derivative according to claim 1 which is 1-methylcarbamoyl-3-(3,5-dichlorophenyl)-2-thiohydantoin.

9. The hydantoin derivative according to claim 1 which is 1-ethylcarbamoyl-3-(3,5-dichlorophenyl)-2-thiohydantoin.

* * * * *